(12) United States Patent
Hu et al.

(10) Patent No.: US 8,284,998 B2
(45) Date of Patent: Oct. 9, 2012

(54) METHOD OF ESTIMATING DEPTHS FROM A SINGLE IMAGE DISPLAYED ON DISPLAY

(75) Inventors: Miao Hu, Hangzhou (CN); Jian-Hua Lin, Hangzhou (CN); Jin Wang, Hangzhou (CN)

(73) Assignee: ArcSoft Hangzhou Co., Ltd., Hangzhou, Zhejiang Province (CN)

( * ) Notice: Subject to any disclaimer, the term of this patent is extended or adjusted under 35 U.S.C. 154(b) by 315 days.

(21) Appl. No.: 12/828,303

(22) Filed: Jul. 1, 2010

(65) Prior Publication Data

US 2012/0002871 A1    Jan. 5, 2012

(51) Int. Cl.
*G06K 9/00* (2006.01)
*G01F 19/00* (2006.01)

(52) U.S. Cl. .......................................... 382/106; 73/427
(58) Field of Classification Search .................. 382/106, 382/164, 171, 173; 348/382; 359/816; 73/427
See application file for complete search history.

(56) References Cited

U.S. PATENT DOCUMENTS 5,076,687 A  * 12/1991 Adelson .................... 356/4.04
8,164,628 B2 *  4/2012 Stein et al. .................. 348/148

OTHER PUBLICATIONS

Ashutosh Saxena, "3-D depth reconstruction from a single still image",vol. 76, No. 1, International Journal of Computer Vision, Aug. 16, 2007.
Levin, "A closed form solution to natural image matting",vol. 30, No. 2, IEEE Transactions on Pattern Analysis and Machine Intelligence, Feb. 2008.

\* cited by examiner

*Primary Examiner* — Abolfazl Tabatabai
(74) *Attorney, Agent, or Firm* — Winston Hsu; Scott Margo

(57) ABSTRACT

A method of estimating depths on a monocular image displayed on a display is utilized for improving correctness of depths shown on the display. Feature vectors are calculated for each patch on the monocular image for determining an intermediate depth map of the monocular image in advance. For improving the correctness of the intermediate depth map, an energy function in forms of vectors is minimized for calculating a best solution of the depth map of the monocular image. Therefore, the display may display the monocular image according to a calculated output depth map for having an observer of the display to correctly perceive depths on the monocular image.

4 Claims, 2 Drawing Sheets

Patch i1

Patch i3    Patch i    Patch i4

Patch i2

METHOD OF ESTIMATING DEPTHS FROM A SINGLE IMAGE DISPLAYED ON DISPLAY

BACKGROUND OF THE INVENTION

1. Field of the Invention

The present invention relates to a method of estimating depths on an image displayed on a display, and more particularly, to a method of estimating depths on a monocular image displayed on a display according to a supervised learning approach and a global optimization approach.

2. Description of the Prior Art

Depth estimation has continuously become an effort-taking subject in visual computer sciences. Conventionally, depths on a monocular image are estimated by using a laser scanner or a binocular stereo vision system. However, using a binocular stereo vision system requires adjustment on the camera taking a scanner picture, and using a laser scanner takes huge capitals as well, so that both the apparatuses bring significant complexities. Therefore, some algorithms have been developed to processing depth estimation on the monocular image, where the developed algorithms are based on some assumptions, such as noiseless images or using a dynamic Bayesian model used on indoor images. These assumptions bring restrictions in correctness of depth estimations.

SUMMARY OF THE INVENTION

The claimed invention takes a supervised learning approach performed by collecting a training set of monocular images and their corresponding real depth map, by applying supervised learning to predict the value of the depth map as a function of the monocular image. The supervised learning approach could be ANN (Artificial Neural Network) or other similar approach in the pattern recognition field.

The claimed invention discloses a method of estimating depths on a monocular image displayed on a display. The method comprises transforming grey levels of a monocular image from a first color field to a second color field, which is indicated by an intensity channel and two color channels; segmenting the monocular image into a plurality of patches; calculating a feature vector for each of the plurality of patches according to a serial of filters whose output combined with their square energies form the feature vector; and estimating an intermediate depth map of the monocular image according to the calculated feature vector of each of the plurality of patches with given supervised learning approach; and calculating an output depth map according to an equation $(L+\lambda U)d=\lambda d_p$. $\lambda$ is a normalized parameter. U indicates an identity matrix. $d_p$ indicates the intermediate depth map. d indicates the output depth map. L is a matting Laplacian matrix.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
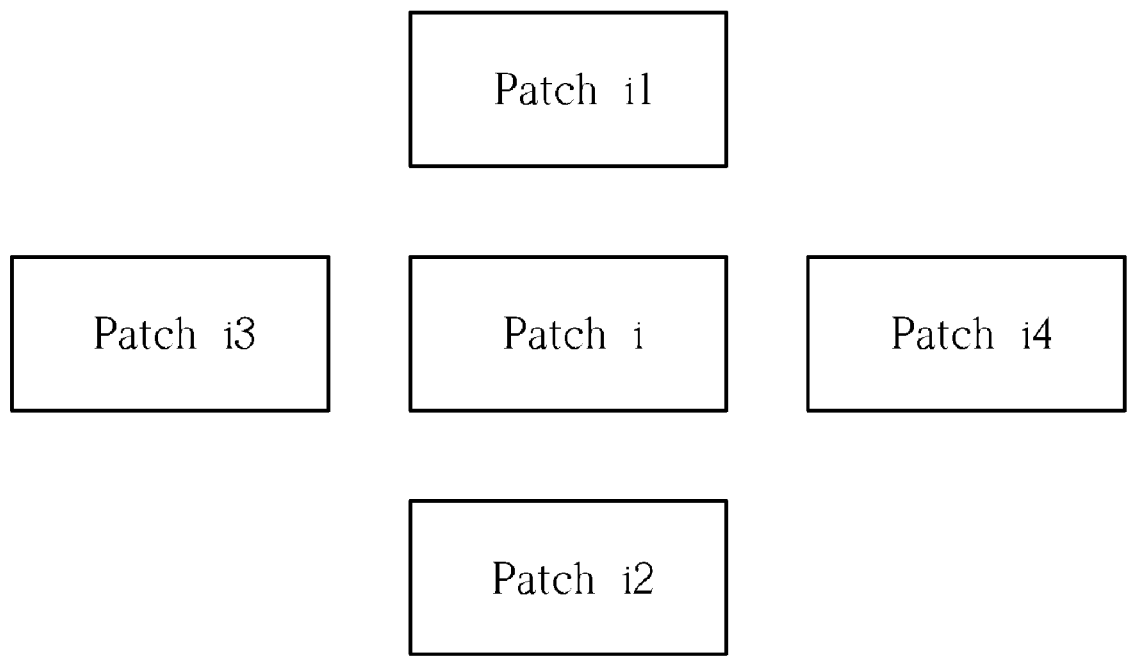
FIG. 1 illustrates neighboring patches considered along with a patch to be calculated with a feature vector in depth estimation of the present invention.

For relieving the restrictions in correctness of depth estimation of the above-mentioned algorithms, a method of estimating depths on images displayed on a display is disclosed herein. In the disclosed method, first, a training set of images including practically-measured depths on the images is gathered, and then a global optimization function is used for optimizing the depths.

In a monocular image, it is not difficult for a human being to analyze a stereo structure of the monocular image since the human being has empirical knowledge about his environments. Depth-related cues are buried within the empirical knowledge and include texture variations, texture gradients, and haze. In the method of the present invention, depth information, which may be indicated by texture energy, texture gradients, and haze, of a monocular image, is used for determining depth-related eigenvectors of the monocular image. Note that a monocular image processed according to the method of the present invention is segmented into a plurality of patches similar in shape, color, edge, or texture, such as a plurality of rectangle-shaped patches similar in shapes.

While calculating the texture energy of the monocular image, a monocular image is supposed to include color images applying RGB fields. For calculating the texture energy, grey levels of pixels on the monocular image are transformed from the RGB field to YCbCr fields so that the Y field, which indicates intensity of the monocular image, may be used for calculating the texture energy, where both RGB fields and YCbCr fields are common knowledge for people who skilled in related art of the present invention. The Y channel of the monocular image is then processed by nine filters indicated by Laws mask to determine the texture energy, where Laws Mask is conventionally used for measuring texture energy and is common knowledge for those who skilled in the related art. Note that a first filter defined by Laws mask, which is a local averaging filter, is used on a low-frequency part of the color channels of the monocular image for capturing haze of the monocular image since haze is reflected in the low frequency information of the color channels of the monocular image.

For calculating the texture gradient of the monocular image, convolution is performed on the Y channel of the monocular image and six texture gradient filters defined by Nevetia-Babu filters, which are common knowledge for those who skilled in the related art.

The depth information of the monocular image may be indicated by at least one feature vector. For a monocular image, a feature vector of a patch i on the monocular image may be indicated as:

$$E_i(n) = \sum_{(x,y)\in patch(i)} |I(x, y) * F_n(x, y)|^k, \quad (1)$$

$$k = \{1, 2\}, n = 1, 2, \ldots, 17$$

i indicates a patch number on the monocular image, which has been segmented into a plurality of patches. (x,y) indicates a pixel on the patch i. $F_n(\cdot)$ indicates a filter defined by Laws mask or Nevetia-Babu, or a filter for a color channel. Fn(•)*I(•) ("*" means convolution) indicates properties within the monocular image, such as the texture energy, the texture gradient, and haze, of the monocular image. n indicates a filter number ranged from 1 to 17. Note that there are seventeen filters used in the equation (1), nine of the filters are defined by Laws mask, six of the filters are defined by Nevetia-Babu filters, and two local averaging filters, where the nine Laws mask filters and the six Nevetia-Babu filters operate on the Y field, and both the local averaging filter operate on the Cb and Cr fields. The nine Laws mask filters are used for local averaging, edge detection, and spot detection. The six Nevatia-Babu filters are used for providing information regarding the direction of texture gradient. While $F_n(\bullet)$ indicates a filter defined by Laws mask, the convolution of $F_n(\bullet)$ and $I(\bullet)$, i.e., $F_n(\bullet)*I(\bullet)$, provides information about texture energy; while $F_n(\bullet)$ indicates a filter defined by Nevetia-Babu, the convolution $F_n(\bullet)*I(\bullet)$ provides information about texture gradient; and while $F_n(\bullet)$ indicates a filter applied on the Cb or Cr field, the convolution $F_n(\bullet)*I(\bullet)$ provides information about haze.

As can be observed from the equation (1), the condition $k \in \{1,2\}$ gives an absolute energy sum and an squared energy sum to the feature vector $E_i(n)$, and as a result, the feature vector $E_i(n)$ has a dimension of 2×17 filters=34, where 2 indicates the dimension of the variable k. For more precisely estimating depths of the monocular image, neighboring patches of the patch i are also considered. Please refer to FIG. 1, which illustrates neighboring patches i1, i2, i3, and i4 considered along with the patch i while calculating feature vectors in depth estimation of the present invention. As shown in FIG. 1, while calculating the feature vector of the patch i, feature vectors of the patches i1, i2, i3, and i4 are also calculated so that there are five feature vectors to be calculated, and it may be regarded as calculating a primary feature vector having 34×5 patches=170 dimensions. According to the primary feature vector corresponding to each patch on the monocular image, an intermediate depth map $d_p$ of the monocular image carrying calculated feature vectors of each patch on the monocular image may be retrieved. However, correctness of the intermediate depth map still has to be improved so that an ideal depth map d, which is regarded as an output depth map in the disclosed method of the present invention, may be retrieved, where the output depth map d indicates more precise depths of the monocular image while the monocular image is displayed and observed with naked eyes. Note that both the depth maps $d_p$ and d occupy forms of vectors.

In the method of the present invention, an energy function E(d) is disclosed for retrieving a best solution of the output depth map d. The disclosed energy function E(d) may be defined as follows:

$$E(d) = d^T L d + \lambda (d - d_p)^T (d - d_p) \quad (2)$$

L is a matting Laplacian matrix. λ is a normalized parameter, and in an embodiment of the present invention, λ may be about $10^{-4}$. L is defined as follows:

$$L(i, j) = \sum_{k|(i,j) \in w_k} \left( \delta_{ij} - \frac{1}{|w_k|} \left( 1 + (I_i - \mu_k)^T \left( \Sigma_k + \frac{\varepsilon}{|w_k|} U \right)^{-1} (I_j - \mu_k) \right) \right) \quad (3)$$

$I_i$ and $I_j$ respectively indicate grey levels of pixels i and j on the monocular image. $\delta_{ij}$ indicates a Kronecker Delta function on the pixels i and j. $w_k$ indicates a window covering pixels i and j on the monocular image. $\mu_k$ indicates a mean value of colors covered the window $w_k$, and $\Sigma_k$ indicates a covariance matrix of the colors covered by the window $w_k$. U indicates an identity matrix. $\in$ indicates a normalized parameter. $|w_k|$ indicates a number of pixels covered by the window $w_k$.

While a value of the energy function E(d) is minimized, a best solution of the output depth map d may be determined as well. According to the equation (2), a sparse linear algebra equation for solving the equation (2) to retrieve the best solution of the output depth map d may be determined as follows:

$$(L + \lambda U)d = \lambda d_p \quad (4)$$

After determining the output depth map d according to the equation (4), the display may display the monocular image according to the output depth map d, which indicates estimated depths on the monocular image, so that an observer of the display may perceive depths on the monocular image in a stereo manner.

Figure 2:
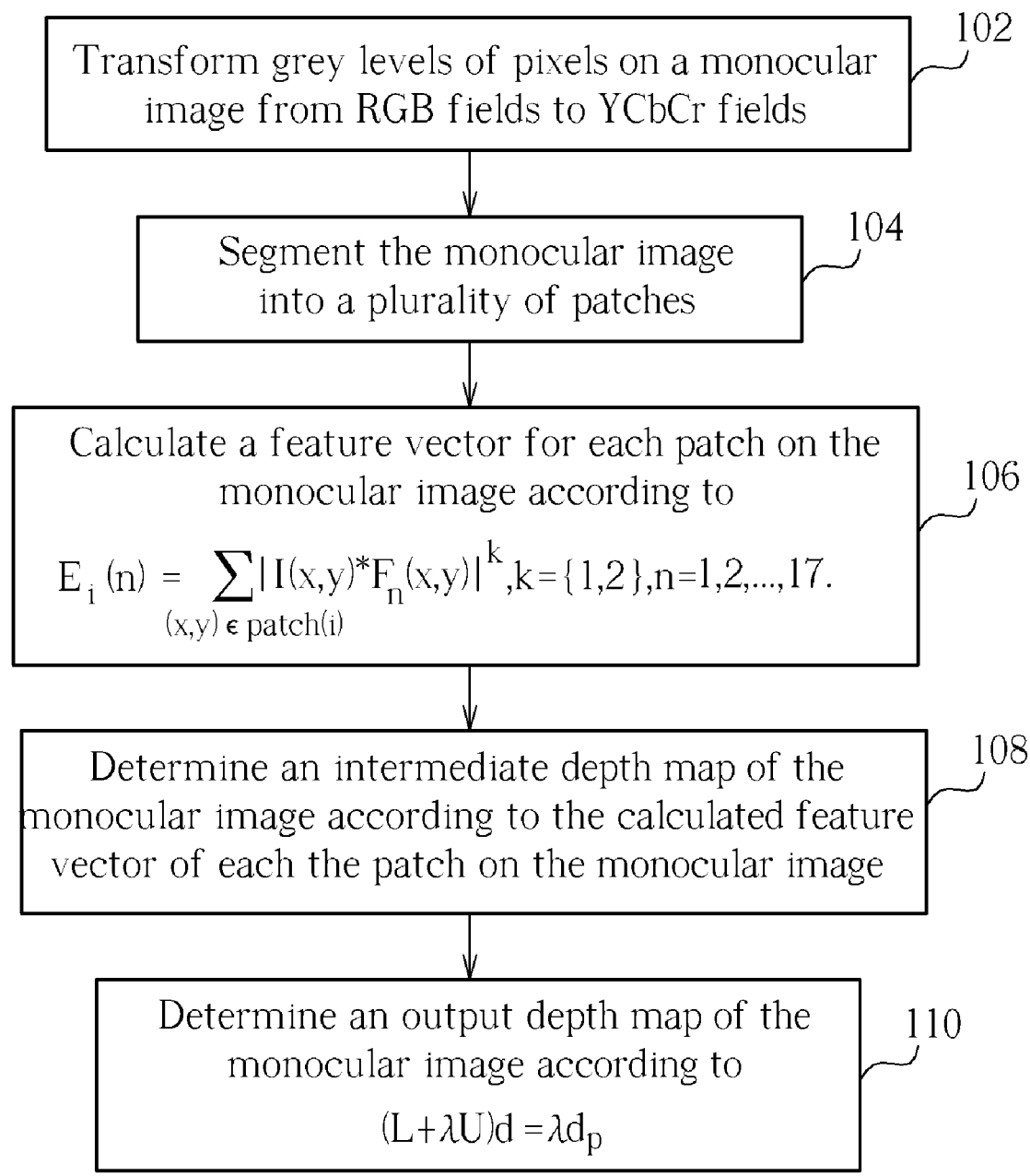
FIG. 2 illustrates a flowchart of the method of the present invention for estimating depths on the monocular image on the display according to the above descriptions.

Please refer to FIG. 2, which illustrates a flowchart of the method of the present invention for estimating depths on the monocular image on the display according to the above descriptions. As shown in FIG. 2, the disclosed method may include steps as follows:

Step 102: Transform grey levels of pixels on a monocular image from RBG fields to YCbCr fields.

Step 104: Segment the monocular image into a plurality of patches.

Step 106: Calculate a feature vector for each patch on the monocular image according to an equation $$E_i(n) = \sum_{(x,y) \in patch(i)} |I(x, y) * F_n(x, y)|^k, k = \{1, 2\}, n = 1, 2, \ldots, 17.$$

Step 108: Determine an intermediate depth map of the monocular image according to the calculated feature vector of each the patch on the monocular image.

Step 110: Determine an output depth map of the monocular image according to an equation $(L+\lambda U)d=\lambda d_p$.

The steps shown in FIG. 2 indicate a summary of the above disclosure of the present invention. However, embodiments generated by reasonable combinations or permutations of the above steps, or generated by adding restrictions mentioned above, should be regarded as embodiments of the present invention.

The present invention discloses a method of estimating depths on a monocular image displayed on a display, for improving correctness of depths shown on the display. Feature vectors are calculated for each patch on the monocular image for determining an intermediate depth map of the monocular image in advance. For improving the correctness of the intermediate depth map, an energy function in forms of vectors is minimized for calculating a best solution of the depth map of the monocular image. Therefore, the display may display the monocular image according to a calculated output depth map for having an observer of the display to correctly perceive depths on the monocular image.

Those skilled in the art will readily observe that numerous modifications and alterations of the device and method may be made while retaining the teachings of the invention.

What is claimed is:

1. A method of estimating depths on a monocular image displayed on a display, comprising:
   transforming grey levels of a monocular image from a first color field to a second color field, which is indicated by an intensity channel and two color channels;
   segmenting the monocular image into a plurality of patches;
   calculating a feature vector for each of the plurality of patches according to a serial of filters whose output combined with their square energies form the feature vector;

determining an intermediate depth map of the monocular image according to the calculated feature vector of each of the plurality of patches; and determining an output depth map according to an equation $$(L+\lambda U)d = \lambda d_p;$$

wherein $\lambda$ is a normalized parameter, U indicates an identity matrix, $d_p$ indicates the intermediate depth map, d indicates the output depth map, and L is a matting Laplacian matrix.

2. The method of claim 1,
wherein the equation for determining the output depth map is a solution of an energy function $E(d) = d^T L d + \lambda (d-d_p)^T (d-d_p)$ in minimizing a value of the energy function;

wherein $\lambda$ is the normalized parameter, $d_p$ indicates the intermediate depth map, d indicates the output depth map, and L is a matting Laplacian matrix;

wherein $(d-d_p)^T$ indicates a transpose of $(d-d_p)$.

3. The method of claim 1,
wherein the matting Laplacian is indicated as follows:

$$L(i,j) = \sum_{k|(i,j)\in w_k} \left( \delta_{ij} - \frac{1}{|w_k|} \left(1 + (I_i - \mu_k)^T \left(\Sigma_k + \frac{\varepsilon}{|w_k|} U\right)^{-1} (I_j - \mu_k)\right) \right);$$

wherein $I_i$ and $I_j$ respectively indicate grey levels of pixels i and j on the monocular image, $\delta_{ij}$ indicates a Kronecker Delta function on the pixels i and j, $w_k$ indicates a window covering pixels i and j on the monocular image, $\mu_k$ indicates a mean of colors covered the window $w_k$, and $\Sigma_k$ indicates a covariance matrix of the colors covered by the window $w_k$, $\varepsilon$ indicates a normalized parameter, and $|w_k|$ indicates a number of pixels covered by the window $w_k$.

4. The method of claim 1,
wherein calculating the feature vector for each of the plurality of patches comprises:

calculating the feature vector for each of the plurality of patches according to $$E_i(n) = \sum_{(x,y)\in patch(i)} |I(x,y) * F_n(x,y)|^k, k=\{1,2\}, n=1,2,\ldots,17;$$

wherein i indicates a patch number on the monocular image, $F_n(\bullet)$ indicates a plurality of filters for processing the texture energy, the texture gradient, and haze on each of the plurality of patches, $I(\bullet)*F_n(\bullet)$ indicates the texture energy, the texture gradient, and values at the at least one color subfield of the monocular image and n indicates a filter number.

* * * * *